United States Patent [19]

Abè et al.

[11] Patent Number: 4,618,950

[45] Date of Patent: Oct. 21, 1986

[54] ADDRESS DATA ACCESSING DEVICE IN A ROTARY RECORDING MEDIUM REPRODUCING APPARATUS

[75] Inventors: Ryozo Abè; Masaki Sakurai, both of Yokohama, Japan

[73] Assignee: Victor Company of Japan, Ltd., Yokohama, Japan

[21] Appl. No.: 570,908

[22] Filed: Jan. 16, 1984

[30] Foreign Application Priority Data

Jan. 17, 1983 [JP] Japan ................................ 58-4524[U]

[51] Int. Cl.⁴ .......................................... G11B 21/02
[52] U.S. Cl. ...................................... 369/32; 369/33; 360/49; 360/72.2
[58] Field of Search ...................... 369/30, 32, 33, 43, 369/44, 47, 50; 360/49, 72.1, 72.2, 78, 18, 27; 365/234; 358/342

[56] References Cited

U.S. PATENT DOCUMENTS

| | | | |
|---|---|---|---|
| 4,428,074 | 1/1984 | Abe et al. ...................... | 369/111 X |
| 4,480,280 | 10/1984 | Sugiyama et al. ................. | 369/43 X |
| 4,489,398 | 12/1984 | Sugiyama et al. .................... | 369/32 |
| 4,496,993 | 1/1985 | Sugiyama et al. ................. | 369/30 X |
| 4,550,393 | 10/1985 | Sugiyama et al. ............... | 358/342 X |

*Primary Examiner*—Robert L. Richardson
*Attorney, Agent, or Firm*—Michael N. Meller

[57] ABSTRACT

An address data accessing device is used with a reproducing apparatus which reproduces recorded signals from a rotary recording medium which is time-sequentially recorded with a plurality of kinds of information signals, a time address signal, and a chapter address signal. The address data accessing device comprises an instruction decoder supplied with an information signal selecting instruction data when selectively reproducing one kind of information signal from among the plurality of kinds of information signals which are reproduced from the recording medium, an address data fetch circuit for fetching and producing one of the time address signal and the chapter address signal which are reproduced, and a switch circuit for switching and producing one of an output signal of the instruction decoder and a signal from the address data fetch circuit in response to another output signal of the instruction decoder, and for applying an output signal thereof to the address data fetch circuit. The address data fetch circuit alternately fetches and produces the time address signal and the chapter address signal under control of the output signal of the switch circuit.

6 Claims, 7 Drawing Figures

ADDRESS DATA ACCESSING DEVICE IN A ROTARY RECORDING MEDIUM REPRODUCING APPARATUS

BACKGROUND OF THE INVENTION

The present invention generally relates to address data accessing devices in reproducing apparatuses which reproduce recorded signals from a rotary recording medium, and more particularly to an address data accessing device which selectively transmits an address data which is used to search for recorded positions of first and second information signals which are recorded on a rotary recording medium (hereinafter simply referred to as a disc), to a pickup device within the reproducing apparatus in accordance with an instruction from a main reproducing apparatus body.

An electrostatic capacitance type disc (so-called video disc) and a reproducing apparatus for reproducing recorded signals from such a disc have been proposed and reduced to practice. In such a disc, a color video signal and an audio signal are recorded on a spiral track as variations in geometrical configuration. Further, reference signals for tracking control are recorded on both sides of the spiral track. The disc is scanned by a reproducing stylus which has an electrode. Since the electrostatic capacitance between the electrode of the reproducing stylus and the disc varies according to the variations in the geometrical configuration on the disc, the recorded signals are reproduced from the disc by detecting the variations in the above electrostatic capacitance.

On the other hand, an electrostatic capacitance type digital audio disc has been proposed and reduced to practice. In such a digital audio disc, the information signal is recorded similarly as in the case of the video disc. However, in the digital audio disc, a digital audio signal is recorded as the information signal, instead of the color video signal and the audio signal which are recorded on the video disc. The digital audio signal is obtained by subjecting an audio signal to a digital pulse modulation such as a pulse code modulation (PCM). The only differences between the digital audio disc and the video disc are the different information signals which are recorded, and the different formats of the recorded signals which are employed. Aside from these differences, the recorded signals are reproduced from the digital audio disc in the same manner as in the case of the video disc. In other words, the recorded signals are reproduced by detecting the variations in the electrostatic capacitance, and the tracking control is carried out by reproducing reference signals because there is no groove formed on the disc for guiding the reproducing stylus. The diameter of the digital audio disc and the rotational speed of the digital audio disc at the time of reproduction are also the same as those employed in the video disc. Due to these similarities between the digital audio disc and the video disc, the digital audio disc can be played in a video disc reproducing apparatus (video disc player), by modifying a part of the video disc player. In reality, it becomes possible to play the digital audio disc in an existing video disc player, by coupling an adapter which includes an address data accessing device to this existing video disc player.

The digital audio disc has a recording capacity to record signals of up to four channels. There are the following four ways of utilizing the four channels which can be recorded on the digital audio disc: (a) to record digital audio signals of three channels and a digital video signal of one channel; (b) to record digital audio signals of four channels; (c) to record a first 2-channel stereo digital audio signal and a second 2-channel stereo digital audio signal (that is, to record two kinds of 2-channel digital audio signals); and (d) to record digital audio signals of two channels and digital video signals which are transmitted in two channels. The disc player must be designed so that a disc which is recorded with any of the above four signal combinations can be played.

When the disc player plays a disc which is recorded with the signals under (a) above, it is possible to listen to sounds which are generated through three speakers while watching a still picture which is reproduced on a television receiver as a supplementary information to the audio program. On the other hand, when the disc player plays the disc which is recorded with the signals under (b) above, it is possible to listen to 4-channel stereo sounds which are generated through four speakers. It is possible to listen to 2-channel stereo sounds which are generated through two speakers by selecting one of the two 2-channel digital audio signals which are recorded, when playing a disc which is recorded with the signals under (c) above. Further, when playing a disc which is recorded with the signals under (d) above, it is possible to listen to sounds which are generated through two speakers while watching a reproduced picture which is selected from the digital video signals which are recorded in the two channels.

The digital audio disc is also recorded with an address signal. This address signal indicates the recorded position (track position) of the information signal, and is used when searching for a predetermined recorded position of the information signal during a mode such as a random access mode. Hence, the adapter described before includes the address data accessing device which detects the address signal and transmits the detected address signal to the video disc player.

When the disc is recorded with the signals under (c) above, it is necessary to select one of the first and second 2-channel digital audio signals which are recorded on the disc at the time of a normal reproduction mode. Modes in which the first and second 2-channel digital audio signals are selected, are referred to as select modes A and B, respectively.

However, the previously devised address data accessing device had a disadvantage in that it was impossible to search for a program having a desired chapter number and start the reproduction from the desired chapter number, as will be described later on in the specification. This disadvantage was introduced because an address data fetch circuit does not fetch a reproduced chapter address data at the point when a chapter search button of the reproducing apparatus is pushed, when carrying out a search which is based on an address data of a kind different from the mode which is displayed while the normal reproduction is carried out, in either the select mode A or the select mode B. Thus, the reproducing apparatus cannot discriminate the chapter number of the program which is to be searched for. In addition, there was another disadvantage in that the reproducing apparatus may search for and reproduce a program having a chapter number which is subsequent to the last chapter number which was fetched before the chapter search button was pushed.

A differently designed reproducing apparatus was also proposed. According to this reproducing apparatus, the chapter address data at the reproducing position is first fetched at the point when the chapter search button is pushed. Then, an arithmetic operation is performed by using the chapter number which is obtained from the fetched chapter address data and the chapter number which is instructed, to start the reproduction of the music program from the desired chapter number. However, in this reproducing apparatus, the chapter address data must once be reproduced in order to fetch the chapter address data. Thus, there was a disadvantage in that it took a little longer to complete the search.

SUMMARY OF THE INVENTION

Accordingly, it is a general object of the present invention to provide a novel and useful address data accessing device in a disc reproducing apparatus, in which the above-described disadvantages have been eliminated.

Another and more specific object of the present invention is to provide an address data accessing device in a disc reproducing apparatus, which is designed to alternately transmit the chapter address data and the time address data during the select modes A and B.

Still another object of the present invention is to provide an address data accessing device in a disc reproducing apparatus, which is designed to alternately fetch the data of the time address signal and the data of the chapter address signal from the reproduced signal, by an output signal of an instruction decoder which is supplied with the selection instruction data of the information signal, and to alternately transmit the fetched time address data and the chapter address data, during a reproduction in which one kind of information signal among a plurality of kinds of information signals is selectively reproduced from a disc which is time-sequentially recorded with a plurality of kinds of information signals. According to the address data accessing device of the present invention, it is possible to positively carry out a search operation when a chapter search button (time search button) is pushed in a state where the time address data (chapter address data) is fetched and the normal reproduction is carried out while performing the time display (chapter display). In addition, because the arithmetic operations at the time of the search are performed immediately, the reproducing apparatus will start the search operation within a short period of time.

Other objects and further features of the present invention will be apparent from the following detailed description when read in conjunction with the accompanying drawings.

DETAILED DESCRIPTION

Figure 1:
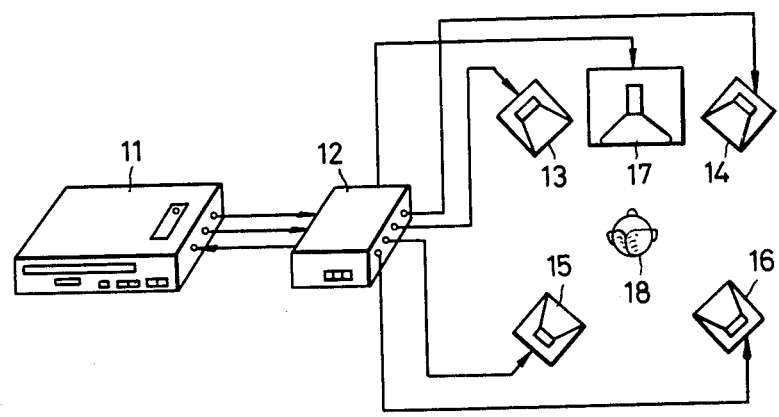
FIG. 1 is a diagram showing a general system of a reproducing system in a case where a digital audio disc is played in a general video disc reproducing apparatus.

FIG. 1 shows the general connections and the like of devices when playing a digital audio disc in a video disc reproducing apparatus (player). In FIG. 1, a signal which is reproduced from the digital audio disc (not shown) when the digital audio disc is played in a video disc player 11, is supplied to an adapter 12 which is designed to enable playing of the digital audio disc in the video disc player 11. The adapter 12 has a built-in address data accessing device according to the present invention, and subjects the reproduced signal to a signal processing which includes demodulation, error correction, digital-to-analog conversion, and the like, so as to obtain the original analog audio signals or the original analog audio and video signals. Audio output terminals of the adapter 12 are independently coupled to speakers 13, 14, 15, and 16. In addition, a video output terminal of the adapter 12 is coupled to a television receiver 17.

Figure 2:
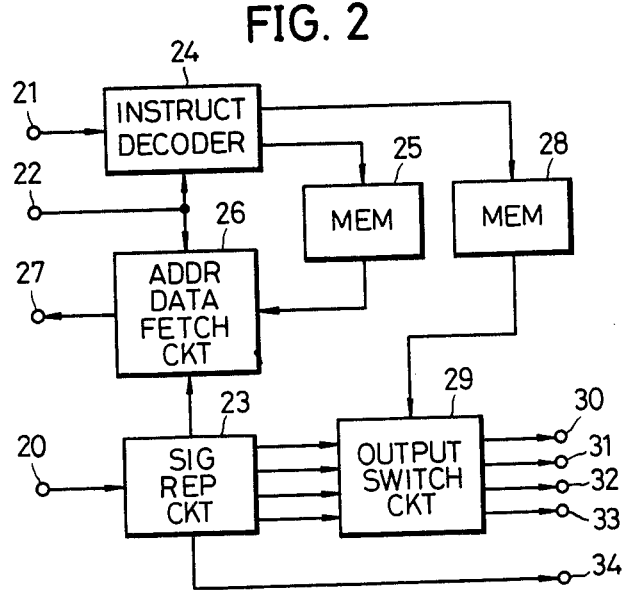
FIG. 2 is a systematic block diagram showing an example of a prior art address data accessing device.

The address data accessing device which is built into the adapter 12 was conventionally designed as shown in FIG. 2. The reproduced signal from the digital audio disc which is played in the video disc player 11, is supplied to an input terminal 20. Moreover, an instruction code which is set when a listener (operator) 18 manipulates buttons on the video disc player 11 in order to select a desired display mode, a search mode, a program, and the like, is supplied to an instruction decoder 24 through an input terminal 21. Further, a clock pulse which is generated in the video disc player 11, is supplied to the instruction decoder 24 and to an address data fetch circuit 26, through an input terminal 22. The reproduced signal from the digital audio disc is supplied to a signal reproducing circuit 23 through an input terminal 20. In the signal reproducing circuit 23, the reproduced signal is subjected to the signal processing which includes demodulation, decoding, error correction, digital-to-analog conversion, and the like, so as to obtain the original analog audio signals, as described before. Each channel of the original analog audio signals thus obtained is independently supplied to an output switching circuit 29. In addition, a video signal from the signal reproducing circuit 23 is produced through an output terminal 34. The address signal within the reproduced digital signal from the signal reproducing circuit 23 is supplied to the address data fetch circuit 26, wherein the address signal is fetched. The signal reproducing circuit 23 may be designed not to carry out a digital-to-analog conversion, so that the signal of digital form is supplied to the output switching circuit 29. In this case, the digital-to-analog conversion may be carried out at the output side of the output switching circuit 29.

The address signal which is recorded on the digital audio disc, includes a so-called chapter address signal (chapter code) and a so-called time address signal (time code). The chapter address signal indicates the location of the music program with respect to a starting position where the first signal is recorded on the digital audio disc. Hence, the chapter address signal indicates that the program is the third program from the starting position on the disc, for example. On the other hand, the time address signal indicates the recorded position of the digital audio signal as the amount of reproducing time required in the normal reproduction mode to reach that recorded position from the starting position where the first signal is recorded on the digital audio disc. Accordingly, when the starting position of the desired music program is to be searched for and the reproduction is to be started from the starting position of the desired music program, the operator pushes a chapter search button on the video disc player 11. On the other hand, when the reproduction is to be started from a desired time position, the operator pushes a time search button on the video disc player 11.

When the chapter search button is pushed, the video disc player 11 generates a 2-bit chapter address signal fetch instruction data having a value "00", for example, and this 2-bit fetch instruction data is supplied to the instruction decoder 24 through the input terminal 21. The instruction decoder 24 supplies a signal which is based on the fetch instruction data to memories 25 and 28. Accordingly, the memory 25 generates a signal having a predetermined polarity, and supplies this signal to the address data fetch circuit 26. As a result, the address data fetch circuit 26 fetches only the address data in the chapter address signal. The fetched chapter address data is then supplied to the video disc player 11 through an output terminal 27, and by use of known means, a pickup reproducing element of the video disc player 11 is fed at a high speed on the digital audio disc until the desired chapter address data is reproduced.

On the other hand, when the time search button on the video disc player 11 is pushed, the video disc player 11 generates a 2-bit time address signal fetch instruction data having a value "01", for example, and this 2-bit fetch instruction data is supplied to the instruction decoder 24. In this case, the instruction decoder 24 produces a signal which causes inversion of the output of the memory 25. Further, the address data fetch circuit 26 fetches only the address data in the time address signal. The fetched time address data is supplied to the video disc player 11 through the output terminal 27.

In a case where the digital audio disc is recorded with the signals described before under (c), that is, in the case where the recorded signals are two kinds of 2-channel digital audio signals (first and second 2-channel digital audio signals), it is necessary to carry out the normal reproduction by selecting an arbitrary one of the two kinds of 2-channel digital audio signals. In this case, when the first 2-channel digital audio signal is selected (select mode A), a 2-bit instruction data having a valve "11" is supplied to the instruction decoder 24. On the other hand, when the second 2-channel digital audio signal is selected (select mode B), a 2-bit instruction data having a value "10" is supplied to the instruction decoder 24. Hence, the output signal of the instruction decoder 24 is supplied to the memory 28, and the output switching circuit 29 is switched over according to the output signal of the memory 28. As a result, during the select mode A, for example, the reproduced audio signals in first and second output lines among four output lines of the signal reproducing circuit 23 shown in FIG. 2 are produced through output terminals 30 and 31, through the output switching circuit 29. In addition, during the select mode B, the reproduced audio signals in third and fourth output lines among the four output lines of the signal reproducing circuit 23 are produced through the output terminals 30 and 31, through the output switching circuit 29.

When playing a digital audio disc which is recorded with the 4-channel signals described before under (b) so as to carry out a 4-channel stereo rerodution, the reproduced audio signals are respectively produced through output terminals 30 through 33. Further, when playing a digital audio disc which is recorded with other signal combinations in the normal reproduction mode, the 2-bit instruction data is either "10" or "11", and the address data fetch circuit 26 fetches the address data of a kind which is the same as the kind of display mode or search mode which was last carried out before the reproduction. This fetched address data is supplied to the video disc player 11 through the output terminal 27. Accordingly, the chapter number which is being reproduced or the time is displayed on an indicator of the video disc player.

However, during the normal reproduction, a search operation may be carried out based on an address data of a kind which is different from the display mode, in either the select mode A or the select mode B of the conventional address data accessing device shown in FIG. 2. For example, during a normal reproduction in which the time address data is fetched and the time is displayed, a search operation may be carried out by pushing a chapter search button so as to search for the first track position of the recorded signal in the music program which has the next chapter number. In this case, the address data fetch circuit 26 does not fetch the chapter address data which is reproduced at the point when the chapter search button is pushed. Therefore, in this case, the video disc player 11 cannot discriminate the chapter number of the music program which is to be searched for and reproduced, or the video disc player 11 sometimes searched for and reproduced the music program of a chapter number which is next to the last chapter number which was fetched in the address data fetch circuit 26.

Figure 3:
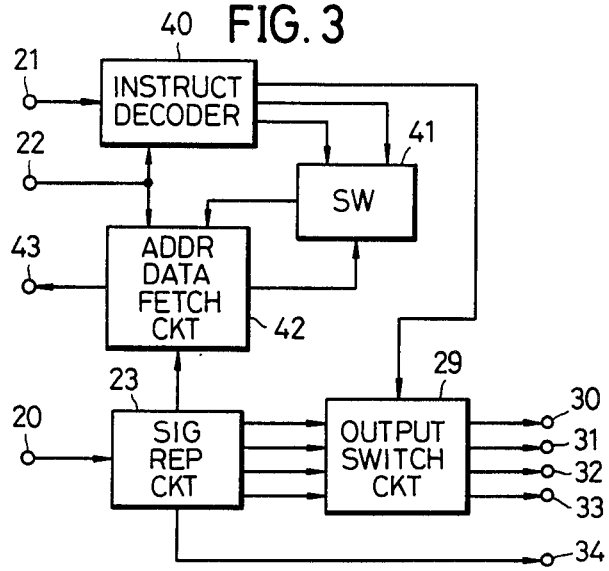
FIG. 3 is a systematic block diagram showing an embodiment of an address data accessing device according to the present invention.
Figure 4:
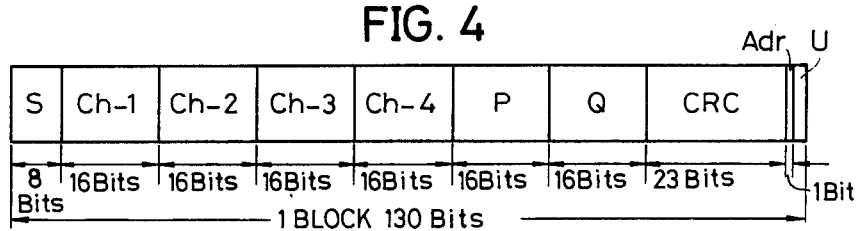
FIG. 4 shows an example of a signal format of one block of digital signals which are recorded on the digital audio disc.

The present invention has eliminated the above disadvantages of the conventional address data accessing device described heretofore, and FIG. 3 is a systematic block diagram showing an embodiment of an address data accessing device according to the present invention. In FIG. 3, those parts which are the same as those corresponding parts in FIG. 2 are designated by the same reference numerals, and their description will be omitted. The digital audio disc which is played in the video disc player 11 is time-sequentially recorded with the digital signal in terms of one block (one frame) which is shown in FIG. 4. In FIG. 4, one block of the digital signal is made up from 130 bits. A synchronizing signal of a fixed pattern is located in the first 8 bits of the block as indicated by a reference character S. One word of digital information data (digital audio signal or digital video signal), having a quantization number of 16 bits for one sampling point, is recorded at locations which are indicated by Ch-1 through Ch-4 for each of the four channels. First and second error correcting codes, which are respectively made up of 16 bits, are arranged at locations indicated by P and Q. A 23-bit error detecting code is arranged at a location indicated by CRC, and a 1-bit address signal is arranged at a location indicated by Adr. The last 2 bits are spare bits which are sometimes called user's bits, and are arranged at a location indicated by U.

The signal reproducing circuit 23 shown in FIG. 3 uses the error detecting code CRC within the reproduced digital signal having the signal format shown in FIG. 4, in order to detect the existence of an error. When an error exists, the erroneous code is corrected by use of the first and second error correcting codes P and Q. Then, the four kinds of digital information data which contain no error have been corrected, of are arranged at the locations indicated by Ch-1 through Ch-4 and transmitted, and the transmitted digital information data are subjected to a digital-to-analog conversion before being supplied to the output switching circuit 29.

On the other hand, as one block of the digital signal shown in FIG. 4 is reproduced, an address data fetch circuit 42 fetches the data in the 128-th bit every time the 128-th bit of the block is reproduced in the signal reproducing circuit 23. As indicated by Adr in FIG. 4, one bit of the address signal is transmitted in one block and for example, all of the bits which make up the address signal are transmitted when 196 blocks of the digital signal are transmitted. In other words, the address signal is made up of 196 bits. The digital signal is time-sequentially recorded on the disc in terms of these blocks, with a repetition frequency of 44.1 kHz, for example. Thus, when this disc is rotated at a rotational speed of 900 rpm, 2940 blocks will be recorded and reproduced in one revolution of the disc. This means that the 196-bit address signal is recorded and reproduced at a rate of 15 times in one revolution of the disc.

Figure 5:
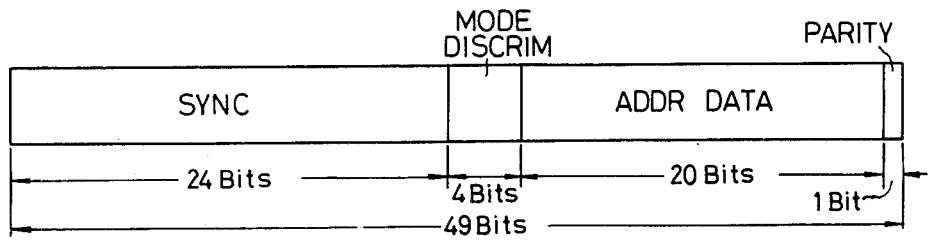
FIG. 5 shows an example of a signal format of an address signal which is fetched in the address data accessing device according to the present invention.

For example, the 196-bit address signal is time-sequentially made up from four kinds of address codes each having 49 bits. The four kinds of address codes comprise a time address code and first through third chapter address codes, for example, and the constitution of each address code is the same. The address codes each have a signal format shown in FIG. 5. In FIG. 5, a 24-bit synCchronizing signal is recorded in the first 24 bits of the address code is indicated by SYNC. The value of the 24-bit synchronizing signal differs depending on the four kinds of address codes. Four bits which are subsequent to the 24-bit synchronizing signal, includes a source mode signal, a normal/stop mode discriminating signal, and the like. The source mode signal indicates the source mode, that is, the signal combination of the recorded signal from among the signal combinations under (a) through (d) described before. The normal/stop mode discriminating signal indicates whether the video disc player should assume a stop reproduction mode in which the same track turn is repeatedly reproduced. The address data is located in the 20 bits which are subsequent to these four bits, and the last one bit of the address code is a parity bit.

In the case of the time address code, the address data is time data which indicates the reproducing time required in the normal reproduction mode to reach the track position, where that time address code is recorded from the starting position at which the recording of the programs was started at the time of the recording. On the other hand, in the case of the chapter address code, the address data indicates the location of the music program which is recorded at the position where that chapter address code is recorded, with respect to the starting position at which the recording of the programs was started at the time of the recording. Thus, the chapter address code indicates that the music program is the third program from the starting position on the disc, for example. The time address signal and the chapter address signal are time-sequentially recorded on the disc together with the information signal.

It will now be assumed that the digital audio disc is recorded with the signal combination under (c) described before, that is, that the digital audio disc is time-sequentially recorded with the first 2-channel stereo digital audio signal and the second 2-channel stereo digital audio signal. Suppose that one of the two 2-channel stereo digital audio signals is to be selectively reproduced.

In this case, as in the case of the conventional device described previously, the 2-bit instruction data having the value "11" or "10" is supplied to an instruction decoder 40 shown in FIG. 3 from the video disc player 11, through the input terminal 21. The instruction decoder 40 produces a switching signal which is in accordance with the instruction data, and applies this switching signal to the output switching circuit 29 to switch the output switching circuit 29. At the same time, the instruction decoder 40 produces a time address data fetch instruction signal and a chapter address data fetch instruction signal in parallel, and supplies these instruction signals to a switching circuit 41.

The switching circuit 41 is designed to switch and selectively supply one of the two instruction signals to the address data fetch circuit 42, based on a switching signal from the address data fetch circuit 42. This switching signal is generated from the address data fetch circuit 42 every time the address data within the 49 bits shown in FIG.5 is produced from the address data fetch circuit 42 and supplied to the video disc player 11 through an output terminal 43. Accordingly, the time address data fetch instruction signal and the chapter address data fetch instruction signal are alternately produced from the switching circuit 41 and supplied to the address data fetch circuit 42 every time one address data is produced from the address data fetch circuit 42. Consequently, the address data fetch circuit 42 alternately fetches the time address data and the chapter address data, and the fetched address data is supplied to the video disc player 11 through the output terminal 43.

In this state, suppose that the operator pushes the chapter search button on the video disc player 11 in order to search for and reproduce another desired music program. In this case, even when the time display is made in the video disc player 11, the address data fetch circuit 42 constantly and intermittently produces the newest chapter address data which is being reproduced. For this reason, the chapter search operation can be started within an extremely short period of time compared to the time which is required to start the chapter search operation by use of the conventional device, and moreover, the reproducing stylus can be fed to the correct position at a high speed. During the normal reproduction, one display mode (time display mode or the chapter display mode) which is selected by the operator is displayed on the indicator of the video disc player 11.

On the other hand, when the time search button is pushed during the normal reproduction in a state where the display is given in the time display mode, the address data fetch circuit 42 constantly produces the newest time address data which is obtained at the point when the time search button is pushed. Thus, the time search operation can be started within an extremely short period of time compared to the time which is required to start the time search operation by use of the conventional device.

During the time search operation, only the time address data fetch instruction signal is supplied to the switching circuit 41 from the instruction decoder 40. On the other hand, only the chapter address data fetch instruction signal is supplied to the switching circuit 41 from the instruction decoder 40 during the chapter search operation. Hence, even when the switching circuit 41 is switched, only the time address data fetch instruction signal is supplied to the address data fetch circuit 42 during the time search operation, and only the chapter address data fetch instruction signal is supplied to the address data fetch circuit 42 from the instruction decoder 40 during the chapter search operation.

The present invention is not limited to the embodiment described heretofore. For example, the instruction decoder 40 may be designed to supply a valid switching signal and the time address data fetch instruction signal or the chapter address data fetch instruction signal to the switching circuit 41 during the select modes A and B, so that the switching circuit 41 produces an address data fetch instruction signal which is different from the address data fetch instruction signal produced up to that point, every time the address data fetch circuit 42 produces one address data. The valid switching signal validates the switching operation in the switching circuit 41. On the other hand, the instruction decoder 40 may be designed to supply an invalid switching signal and one of the time address data fetch instruction signal and the chapter address data fetch instruction signal during the time search and chapter search operations, so as to stop the switching operation in the switching circuit 41 and supply only a predetermined address data fetch instruction signal to the switching circuit 41. The invalid switching signal invalidates and stops the switching operation in the switching circuit 41. Further, the device shown in FIG. 3 need not be used in the form of the adapter 12, and may be built within the video disc player 11.

Figure 6:
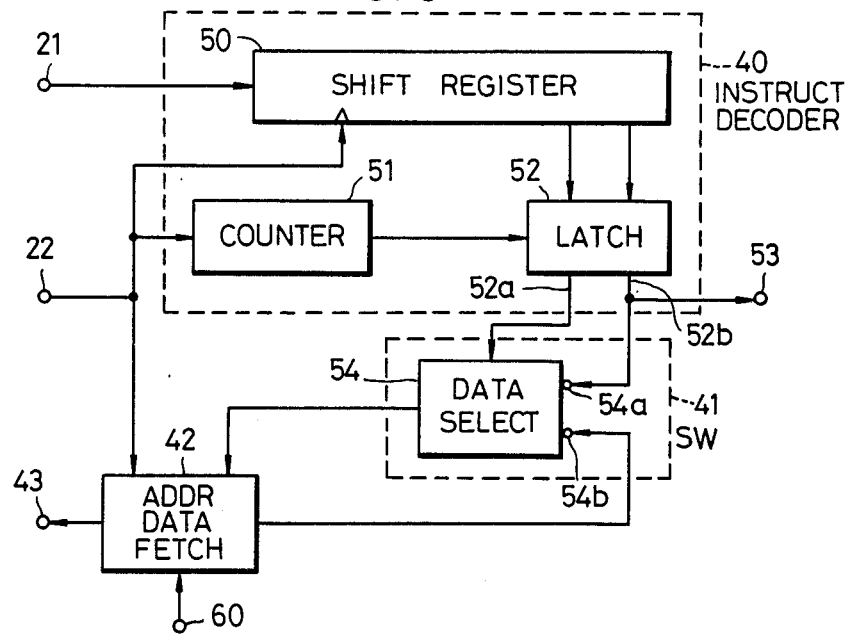
FIG. 6 is a systematic block diagram showing an essential part of the block system shown in FIG. 3, in more detail.
Figure 7:
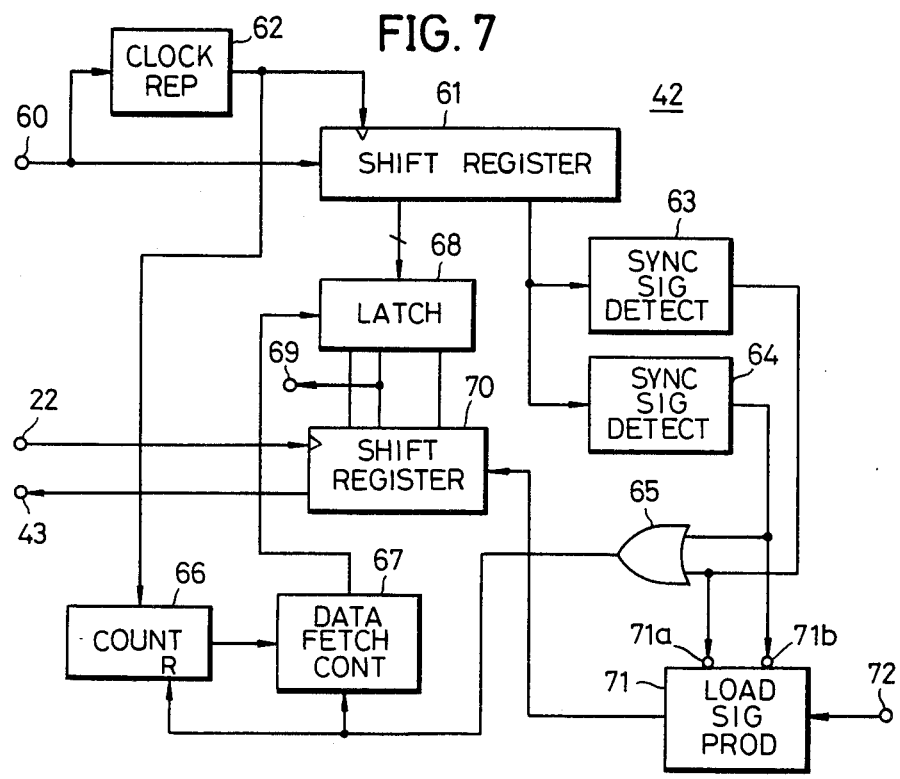
FIG. 7 is a systematic block diagram showing the address data fetch circuit of FIGS. 3 and 6 in more detail.

FIGS. 6 and 7 shows concrete block systems of the instruction decoder 40, the switching circuit 41, and the address data fetch circuit 42.

In FIG. 6, the instruction signal is supplied to a shift register 50 in the instruction decoder 40, through the input terminal 21. The shift register 50 is driven by the clock pulse which is applied to the shift register 50 through the input terminal 22. An output of the shift register 50 is latched in a latch circuit 52, every time a predetermined number of the clock pulses from the input terminal 22 is counted in a counter 51. Between two output lines 52a and 52b of the latch circuit 52, an output which is produced through the output line 52a is supplied to a data selector 54 as a switching signal. This data selector 54 constitutes the switching circuit 41. An output which is produced through the other line 52b, is supplied to one input terminal 54a of the data selector 54, and is also supplied as a switching signal to the output switching circuit 29 through a terminal 53. A switching signal from the address data fetch circuit 42, which will be described later on, is supplied to the other input terminal 54b of the data selector 54. The data selector 54 switches the signal 52a and the output line from the output line 52b by the switching signal supplied to the terminal 54b from the address data fetch circuit 42 and supplies one of these signals to the address data fetch circuit 42 as a data type instruction signal which indicates the time address data or the chapter address data. The chapter address is indicated when the output from the output lines 52a and 52b of the latch circuit 52 is "00", and similarly, the time address is indicated when the output from the output lines 52a and 52b is "01". The output from the output line 52b is the switching signal which is supplied to the output switching circuit 29 when the output from these output lines 52a and 52b is "10" and "11".

A concrete construction of the address data fetch circuit 42 is shown in FIG. 7. The data which is applied to a terminal 60 from the signal reproducing circuit 23, is supplied to a shift register 61 and to a clock reproducing circuit 62. A clock pulse which is formed in the clock reproducing circuit 62, is applied to a clock input terminal of the shift register 61 and to a clock input terminal of a counter 66. Predetermined upper bits of the shift register 61 are respectively supplied to a time address synchronizing signal detecting circuit 63 and a chapter address synchronizing signal detecting circuit 64. The remaining 25 bits of the shift register 61 are supplied to a latch circuit 68 in parallel. Outputs of the synchronizing signal detecting circuits 63 and 64 are respectively supplied to an OR circuit 65 and to input terminals 71a and 71b of a load signal producing circuit 71.

An output of the OR circuit 65 is supplied to a reset terminal of the counter 66 and to a data fetch control circuit 67. The data fetch control circuit 67 supplies a latch pulse to the latch circuit 68, when supplied with an output signal of the counter 66 which has counted a predetermined number of clock pulses and an output detected synchronizing signal of the OR circuit 65. As a result, the latch circuit 68 latches the 25-bit output among the total output of the shift register 61. An output from the second bit of the latch circuit 68 is supplied to the input terminal 54b of the data selector 54 shown in FIG. 6, through a terminal 69.

The data type instruction signal from the data selector 54 is supplied to the load signal producing circuit 71 through a terminal 72. The load signal producing circuit 71 is a kind of a switching circuit. When the data type instruction signal assumes a value "0", the load signal producing circuit 71 switches over to the terminal 71b, to which the output of the chapter address synchronizing signal detecting circuit 64 is applied. On the other hand, when the data type instruction signal assumes a value "1", the load signal producing circuit 71 switches over to the terminal 71a to which the output of the time address synchronizing signal detecting circuit 63 is applied. Accordingly, the load signal producing circuit 71 produces and supplies a load signal to a parallel-input/serial-output type 25-bit shift register 70, when there is an output from the time address synchronizing signal detecting circuit 63 in a state where the load signal producing circuit 71 is switched over to the terminal 71a and when there is an output from the chapter address synchronizing signal detecting circuit 64 in a state where the load signal producing circuit 71 is switched over to the terminal 71b. Hence, the shift register 70 fetches the output of the latch circuit 68 according to the clock signal from the terminal 22 and successively produces an output signal through the output terminal 43. Because the operation of the shift register 70 is controlled by the load signal from the load signal producing circuit 71, the shift register 70 alternately fetches and produces the chapter address and the time address from the latch circuit 68.

Further, the present invention is not limited to these embodiments, but various variations and modifications may be made without departing from the scope of the present invention.

What is claimed is:

1. An address data accessing device in a reproducing apparatus which reproduces recorded signals from a rotary recording medium, said rotary recording medium being time-sequentially recorded with a plurality of channels of information signals, a time address signal and a chapter address signal, said reproducing apparatus having a predetermined mode in which only reproduced information signals in selected channels out of the plurality of channels are produced, each of the information signals in the respective channels being recorded in terms of different programs, said time address signal indicating a time required in a normal reproducing mode to reach a signal recorded position on said rotary recording medium from a starting position where recording of the programs is started at the time of the recording, said chapter address signal indicating each of the different programs, said address data accessing device comprising:

an output switching circuit for selectively outputting only the reproduced information signals in the selected channels out of the plurality of channels in the predetermined mode;

an address data fetch circuit for fetching as an address signal one of the time address signal and the chapter address signal which are reproduced from said rotary recording medium;

an instruction decoder for controlling said output switching circuit and said address data fetch circuit in response to an instruction signal which is supplied to said instruction decoder, said instruction signal comprising two bits for representing four instruction codes, two of said four instruction codes being used for selecting certain channels out of the plurality of channels, the remaining two instruction codes being used for determining which one of the time address signal and the chapter address signal is to be fetched; and a switch circuit for switching output signals of said instruction decoder in response to a switching signal from said address data fetch circuit and for supplying one output signal thereof to said address data fetch circuit, said address data fetch circuit alternately fetching and producing said time address signal and said chapter address signal to transmit the address signals under control of the one output signal of said switch circuit so that either one of said time address signal and said chapter address signal is obtainable in said predetermined mode.

2. An address data accessing device as claimed in claim 1 in which said instruction decoder comprises a shift register which is supplied with said instruction signal and a latch circuit for latching an output of said shift register, and said switch circuit comprises a data selector for carrying out a switching operation in response to one bit of a 2-bit output signal of said latch circuit and for selectively switching and supplying to said address data fetch circuit the other bit of the 2-bit output signal of said latch circuit and the signal which is produced from said address data fetch circuit.

3. An address data accessing device as claimed in claim 1 in which said address data fetch circuit comprises a first shift register for fetching the address signal data which is reproduced from said rotary recording medium, a latch circuit for latching an output of said first shift register, a second shift register for fetching an output of said latch circuit and for transmitting the same, detecting circuit means for detecting a time address synchronizing signal and a chapter address synchronizing signal which are contained within the output of said first shift register, and a load signal producing circuit for alternately switching and producing output signals of said detecting circuit means as a load signal in response to the output signal of said switch circuit, said load signal being applied to said second shift register so that said second shift register fetches the output of said latch circuit, said second shift register alternately fetching and transmitting the time address signal data and the chapter address signal data from said latch circuit in response to said load signal.

4. An address data accessing device as claimed in claim 3 in which said address data fetch circuit further comprises clock pulse forming means for forming a clock pulse which drives said first shift register, a counter for counting the clock pulses from said clock pulse forming means and for producing an output signal every time a predetermined count is reached, said counter being reset by the output of said detecting circuit means, and a data fetch control circuit for producing an output signal which causes said latch circuit to carry out a latch operation when the output signal of said counter and the output signal of said detecting circuit means coincide.

5. An address data accessing device as defined in claim 1 in which said output switching circuit selectively outputs one pair of audio signals out of two pairs of audio signals which are reproduced from said rotary recording medium.

6. An address data accessing device as defined in claim 1 which forms part of an adapter which is coupled to said reproducing apparatus, wherein said adapter enables said reproducing apparatus to play a rotary recording medium which has a signal recording format different from a signal recording format of a rotary recording medium which is originally intended for play in said reproducing apparatus.

* * * * *